US006853945B2

(12) United States Patent
Namburi

(10) Patent No.: US 6,853,945 B2
(45) Date of Patent: Feb. 8, 2005

(54) METHOD OF ON-LINE MONITORING OF RADIAL CLEARANCES IN STEAM TURBINES

(75) Inventor: Adi Narayana Namburi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 10/401,012

(22) Filed: Mar. 27, 2003

(65) Prior Publication Data

US 2004/0204900 A1 Oct. 14, 2004

(51) Int. Cl.[7] ................................................. G01K 5/00

(52) U.S. Cl. ......................... 702/130; 60/782; 701/100

(58) Field of Search ..................... 702/33–36, 113–116, 702/130–132, 136, 157, 158, 166, 182–185; 701/100; 60/226.1, 782, 806; 250/231.13; 415/48, 117

(56) References Cited

U.S. PATENT DOCUMENTS

| | | | | | |
|---|---|---|---|---|---|
| 3,588,265 | A | | 6/1971 | Berry | |
| 3,908,444 | A | | 9/1975 | Peter | |
| 4,159,636 | A | | 7/1979 | Jicha et al. | |
| 4,419,044 | A | * | 12/1983 | Barry et al. | 415/117 |
| 4,836,750 | A | * | 6/1989 | Modafferi et al. | 416/244 A |
| 4,893,983 | A | * | 1/1990 | McGreehan | 415/48 |
| 4,967,552 | A | * | 11/1990 | Kumata et al. | 60/806 |
| 4,987,555 | A | | 1/1991 | Twerdochlib | |
| 4,999,991 | A | * | 3/1991 | Haddad et al. | 60/782 |
| 5,593,278 | A | * | 1/1997 | Jourdain et al. | 415/173.2 |
| 5,601,402 | A | | 2/1997 | Wakeman et al. | |
| 5,685,158 | A | | 11/1997 | Lenahan et al. | |
| 6,037,581 | A | * | 3/2000 | Zorner | 250/231.13 |
| 6,223,524 | B1 | * | 5/2001 | Durcan | 60/226.1 |
| 6,272,422 | B2 | * | 8/2001 | Khalid et al. | 701/100 |
| 6,273,671 | B1 | | 8/2001 | Ress, Jr. | |
| 6,487,491 | B1 | * | 11/2002 | Karpman et al. | 701/100 |

* cited by examiner

*Primary Examiner*—Marc S. Hoff
*Assistant Examiner*—Mohamed Charioui
(74) *Attorney, Agent, or Firm*—Armstrong Teasdale LLP

(57) ABSTRACT

A method of monitoring radial clearances in a steam turbine during operation of the turbine is provided. The method, in an exemplary embodiment, includes measuring a temperature of the rotor shaft at a $time_1$ and at a $time_2$, measuring a temperature of the rotor blade at $time_1$ and at $time_2$, measuring a temperature of the shell at $time_1$ and at $time_2$, calculating a shaft radial growth between $time_1$ and $time_2$, calculating a blade growth between $time_1$ and $time_2$, calculating a shell radial growth between $time_1$ and $time_2$, and determining a change in a radial gap between the shell and a distal end of the rotor blade from $time_1$ to $time_2$ using the following equation: change in radial gap=shell radial growth−shaft radial growth−blade growth.

28 Claims, 3 Drawing Sheets

METHOD OF ON-LINE MONITORING OF RADIAL CLEARANCES IN STEAM TURBINES

BACKGROUND OF THE INVENTION

The present invention relates generally to rotary machines, such as steam and gas turbines, and, more particularly, relates to a method of monitoring clearance between tips of rotating rotor blades and a stationary outer casing of a reaction design high pressure steam turbine.

Steam and gas turbines are used, among other purposes, to power electric generators. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Compressor and turbine sections include at least one circumferential row of rotating blades. The free ends or tips of the rotating blades are surrounded by a stator casing.

The efficiency of the turbine depends in part on the radial clearance or gap between the rotor blade tips and the surrounding casing and the clearance between the rotor and the diaphragm packings. If the clearance is too large, more of the steam or gas flow will leak through the gap between the rotor blade tips and the surrounding casing or between the diaphragm and the rotor, decreasing the turbine's efficiency. If the clearance is too small, the rotor blade tips can strike the surrounding casing during certain turbine operating conditions. Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known that the clearance changes during periods of acceleration or deceleration due to changing centrifugal force on the blade tips and due to relative thermal growth between the rotating rotor and stationary casing. During periods of differential centrifugal and thermal growth of the rotor and casing the clearance changes can result in severe rubbing of the moving blade tips against the stationary casing. This increase in blade tip clearance results in efficiency loss.

Clearance control devices, such as rigid abradable shrouds, have been used in the past to accommodate rotor-to-casing clearance change. However, none are believed to represent an optimum design for controlling such clearance. Also, positive pressure packings have been used that include movable packings that permit the packings to be in a retracted position during startup and in an extended position during steady state operation of the turbine. However, the moving parts can stick during operation preventing the packings from moving between the extended and retracted positions.

BRIEF DESCRIPTION OF THE INVENTION

In one aspect, a method of monitoring radial clearances in a steam turbine during operation of the turbine is provided.

The turbine includes an outer shell and a rotor including a rotor shaft and a plurality of rotor blades attached to the rotor shaft. The method includes measuring a temperature of the rotor shaft at a $time_1$ and at a $time_2$, measuring a temperature of the rotor blade at $time_1$ and at $time_2$, measuring a temperature of the shell at $time_1$ and at $time_2$, calculating a shaft radial growth between $time_1$ and $time_2$, calculating a blade growth between $time_1$ and $time_2$, calculating a shell radial growth between $time_1$ and $time_2$, and determining a change in a radial gap between the shell and a distal end of the rotor blade from $time_1$ to $time_2$ using the following equation: change in radial gap=shell radial growth−shaft radial growth−blade growth.

In another aspect, a method of monitoring radial clearances in a steam turbine during operation of the turbine is provided. The turbine includes an outer shell and a rotor including a rotor shaft and a plurality of rotor blades attached to the rotor shaft. The method includes measuring a temperature of the rotor shaft continuously during operation, measuring a temperature of the rotor blade continuously during operation, measuring a temperature of the shell continuously during operation, calculating a shaft radial growth as a function of rotor shaft temperature over time, calculating a blade growth as a function of rotor blade temperature over time, calculating a shell radial growth as a function of shell temperature over time, and determining a change in a radial gap between the shell and a distal end of the rotor blade over time using the following equation: change in radial gap=shell radial growth−shaft radial growth−blade growth.

In another aspect, a method of monitoring radial clearances in a steam turbine during operation of the turbine is provided. The turbine includes an outer shell and a rotor including a rotor shaft and a plurality of rotor blades attached to the rotor shaft. The method includes calculating a shaft radial growth as a function of rotor shaft temperature over time, calculating a blade growth as a function of rotor blade temperature over time, calculating a shell radial growth as a function of shell temperature over time, and determining a change in a radial gap between the shell and a distal end of the rotor blade over time using the following equation: change in radial gap=shell radial growth−shaft radial growth−blade growth.

DETAILED DESCRIPTION OF THE INVENTION

A method of monitoring radial clearances in a steam turbine during operation of the turbine is described in more detail below. The method calculates thermal expansions of components in the steam turbine which are proportional to averaged metal temperatures at a given location in the turbine. For example, the averaged temperature for the turbine shell at a given location can be obtained from measurements of shell temperature at one or more points across the thickness of the shell. Also, the temperature distribution in the rotor at a given location can be computed from the measured surface temperature and the rate of change of surface temperature over time. The method is described as used in a reaction design steam turbine; however, the method described below is applicable for other steam turbine designs, such as impulse steam turbines. The method uses the measured data from turbine shells and rotors for on-line computations of radial clearances of turbine components. This real time clearance data can be used by an operator to control turbine transients such that tip clearance changes are within specified limits for high thermal efficiency and to avoid rubbing between rotor tips and the shell.

Figure 1:
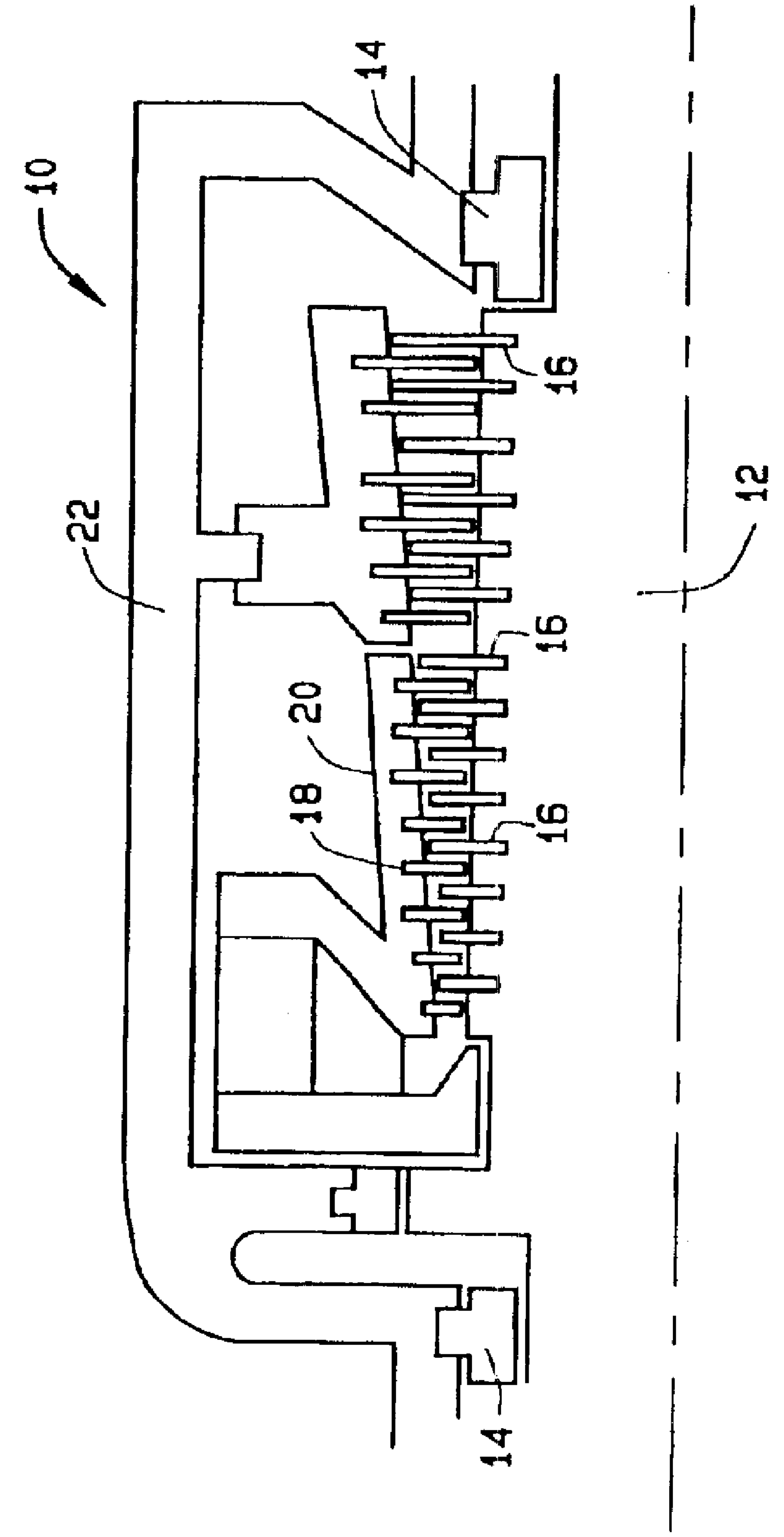
FIG. 1 is a sectional schematic representation of a reaction design steam turbine.

Referring to the drawings, FIG. 1 is a sectional schematic-representation of a reaction design steam turbine 10. Steam turbine 10 includes a rotor shaft 12 passing through turbine 10 and sealed at each end by packings 14. A plurality of turbine blades 16 are connected to shaft 12. Between turbine blades 16 there is positioned a plurality of non-rotating turbine nozzles 18. Turbine blades or buckets 16 are connected to turbine shaft 12 while turbine nozzles 18 extend from an inner housing or shell 20 surrounding turbine blades 16 and nozzles 18. An outer housing 22 encloses inner housing 20 and rotor shaft 12 Steam is directed through nozzles 18 and through blades 16 causing blades 16 to rotate along with turbine shaft 12.

Figure 2:
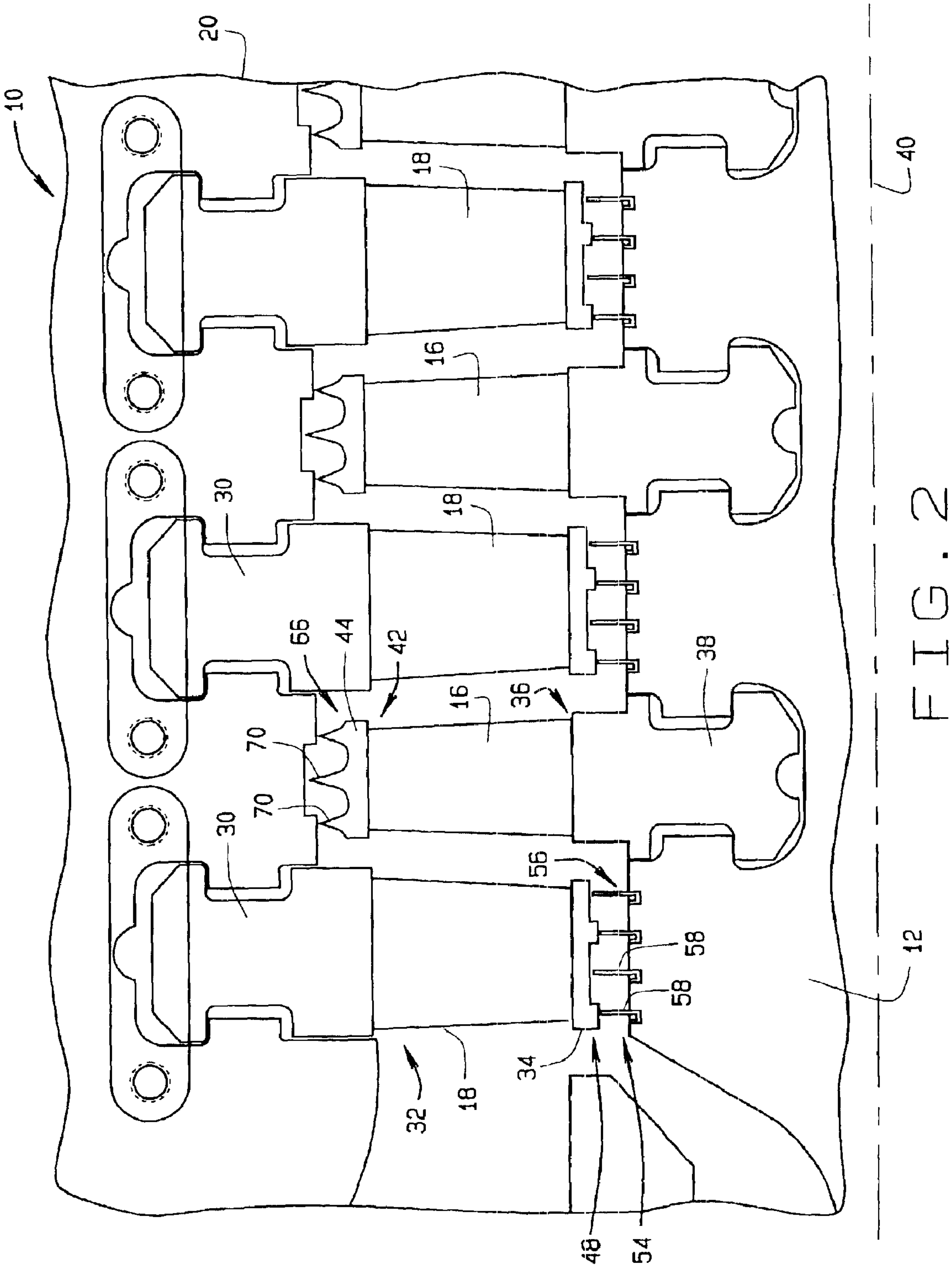
FIG. 2 is an enlarged sectional schematic representation of a portion of the steam turbine shown in FIG. 1.

FIG. 2 is an enlarged sectional schematic representation of inner housing 20 of steam turbine 10. Inner housing 20 includes a plurality of outer ring portions 30. Each outer ring portions 30 include a ring 32 of steam directing nozzles 18 supported within outer ring portion 30, and an inner ring portion 34 contained within nozzle ring 32. Turbine buckets 16 are secured at their inner ends 36 to turbine wheels 38 extending from turbine shaft 12 rotatable about an axis 40. The radial outer ends 42 of buckets 16 include bucket covers 44 which rotate with buckets 16. In one embodiment, a cover 44 is positioned on radial outer end 42 of each bucket 16 and in alternate embodiments on outer ends 42 of two or more buckets 16 in the form of a band so as to permit adjacent buckets 16 to be coupled to a common cover or band.

Inner ring portion 34 of housing 20 includes a packing ring 48. Packing ring 48 is positioned adjacent turbine shaft 12. Turbine shaft 12 includes a sealing means 54 to seal a gap 56 between turbine shaft 12 and inner ring portion 34 of inner housing 20 to prevent the passage of stream through gap 56. Sealing means 54 is positioned adjacent packing ring 48 and includes a plurality of axially spaced brush seals 58 extending from rotor 12. Sealing means 54 can also include axially spaced labyrinth seal teeth (not shown) or a combination of axially spaced labyrinth seal teeth and brush seal seals 58.

Bucket covers 44 include a sealing means 66 to provide a seal in a gap 68 between bucket cover 44 and housing 20 to prevent the passage of steam through gap 68. Sealing means 66 includes a plurality of axially spaced labyrinth seal teeth 70 extending from bucket cover 44. Sealing means 66, in other embodiments include brush seals alone or combined with axially spaced labyrinth seal teeth 70.

Figure 3:
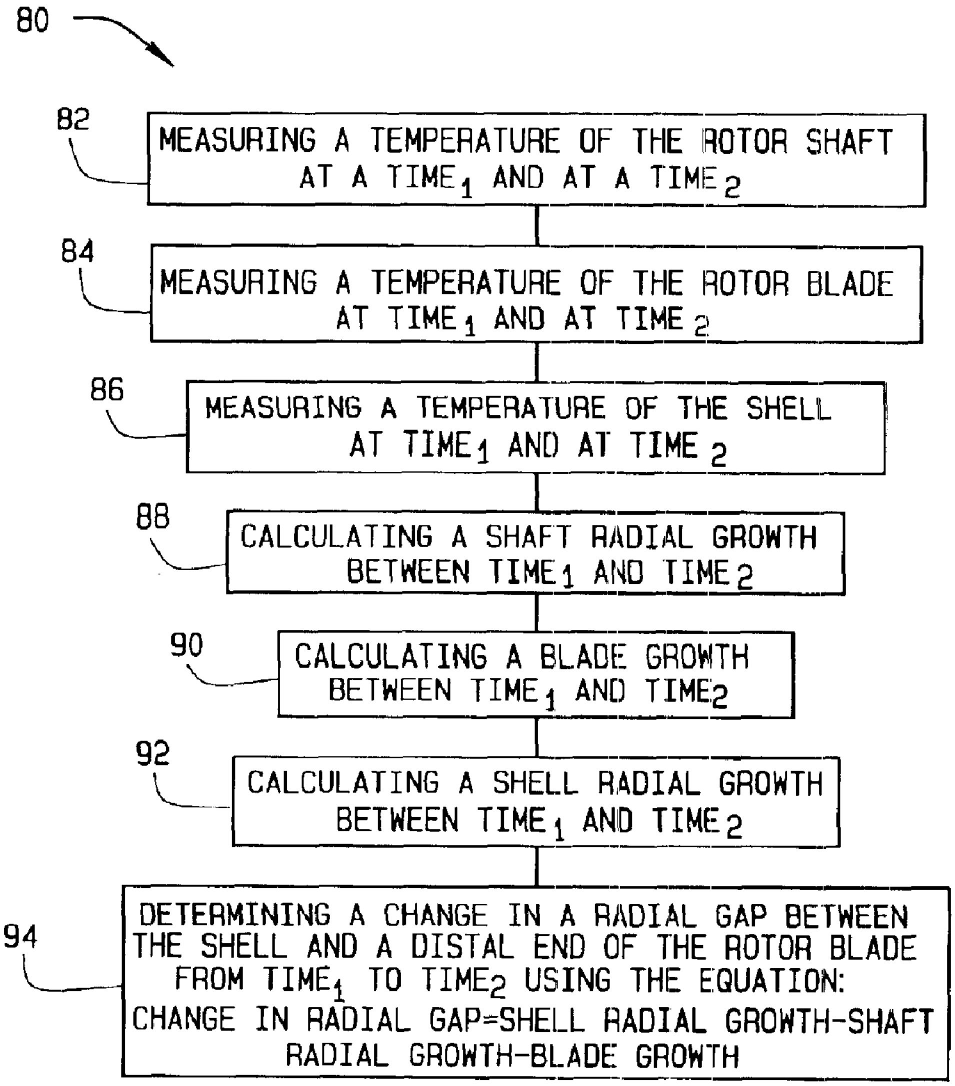
FIG. 3 is a flow chart of a method of monitoring radial clearances in a steam turbine during operation of the turbine.

Referring to FIG. 3, a method 80 of monitoring radial clearances, for example the size of gap 68 and the size of gap 56, in steam turbine 10 includes measuring 82 a temperature of rotor shaft 12 a $time_1$ and at a $time_2$, measuring 84 a temperature of rotor blade 16 $time_1$ and at $time_2$, measuring 86 a temperature of shell 20 at $time_1$ and at $time_2$, calculating 88 a radial growth of shaft 12 between $time_1$ and $time_2$, calculating 90 a growth of blade 16 between $time_1$ and $time_2$, calculating 92 a radial growth of shell 20 between $time_1$ and $time_2$, and determining 94 a change in radial gap 68 from $time_1$ to $time_2$ using the equation:

$$\text{Change In Radial Gap} = \text{Shell Radial Growth} - \text{Shaft Radial Growth} - \text{Blade Growth}.$$

Of course, because the radial growth of blade 16 has no effect on gap 56, the term Blade Growth in the above equation is zero for calculations of the change in radial growth of gap 56. Also, the temperatures of shaft 12, shell 20 and blade 16 can be measured at distinct intervals or can be continuously monitored over time.

The shaft radial growth is equal to the coefficient of thermal expansion of the rotor ($\alpha_R$) times an outer radius ($R_R$) of the rotor times an instantaneous volume averaged temperature ($T_R$) of the rotor.

$$\text{Shaft Radial Growth} = \alpha_R * R_R * T_R$$

The blade radial growth is equal to the coefficient of thermal expansion of the rotor blade ($\alpha_B$) times a length ($L_B$) of the rotor blade times an instantaneous volume averaged temperature ($T_B$) of the rotor blade.

$$\text{Rotor Blade Growth} = \alpha_B * L_B * T_B$$

In most cases the instantaneous volume averaged temperature ($T_B$) of the rotor blade can be closely approximated by the rotor outer surface temperature or the steam temperature.

The shell radial growth is equal to the coefficient of thermal expansion of the shell ($\alpha_S$) times an inner radius ($R_S$) of the shell at the blade tip times an instantaneous volume averaged temperature ($T_S$) of the shell.

$$\text{Shell Radial Growth} = \alpha_S * R_S * T_S$$

In double wall shell designs with horizontal flanges, the radial clearance can vary as a function of circumferential location on the shell. To account for these variances shell radial growth is calculated at the top, the bottom and the side of the shell. Particualrly, the instantaneous volume averaged temperature ($T_S$) of the shell is calculated for each location, at the top, the bottom and the side of the shell.

Figure 4:
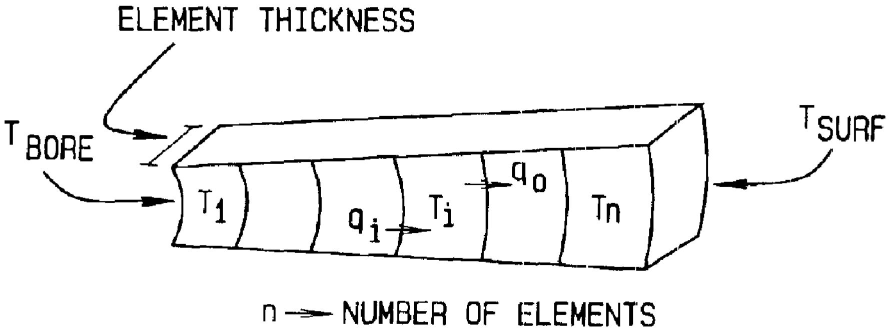
FIG. 4 is a schematic representation of a portion of a steam turbine rotor.

Instantaneous average temperatures $T_R$ and $T_S$ are computed using a finite difference method employing a finite element model utilizing the finite element of a segment of an infinitely long cylinder. This method is explained below using the rotor as an example, and the same method is applicable for the shell, considering the shell as a hollow cylinder. Referring to FIG. 4, the rotor is divided in a specific number of elements, for example 10 elements.

Controls

Elements=10 (Elements number)

Nodes=Elements+2 (Nodes number)

Nr=Nodes−1 (Last Centroid Node Number)

$$\text{Volume} = \frac{(R_o^2 - R_i^2)}{\text{Elements}}[\text{in}^3]$$

Volume→Element Volume

The Temperature & Time Maximum Incremental Changes are set.

MaxDTemp=5 (Maximum Incremental Temperature Change)

$$\text{Max}DTime = \frac{(R_o - R_i)^2}{8 \cdot DO \cdot Elements^2}\ [\text{min}]$$

MaxDTime→Maximum Incremental Time Change

Initializing Temperature

This block assigns an initial temperature value to each boundary of the rotor elements.

For I=1 To Nodes

Tr(I)=InitialTemp [° F.]

Next I

Tr(Nodes)→Array of Nodes elements.

Since Tr(Nodes) represents the boundary temperatures of each rotor element, all Tr elements have an initial value of InitialTemp.

Initial Temperature Distribution

Tsurf=InitialTemp: Tavg=InitialTemp: Tbore=InitialTemp

Since the initial temperature distribution of the rotor is uniform, the rotor surface temperature (Tsurf), the rotor bore temperature (Tbore) and the rotor average temperature (Tavg) have an initial value of InitialTemp.

Centrifugal Stress Factor

Due to the large stress gradient existing at the rotor bore, the BoreCntrfStrs (Bore Centrifugal Stress) needs to be evaluated. This block calculates the Centrifugal Stress Factor (SpeedFact) needed to calculate the Bore Centrifugal Stress defined as:

$$SpeedFact = \frac{InBoreCntrStrs}{RatedSpeed^2}[KSI/RPM2]$$

Extrapolation Factor

To calculate the thermal stress at the surfaces at any given time, Tsurf, Tbore, and Tavg must be known. The extrapolation factor (Extrapfact) is found by means of an extrapolation of the ramp rate temperatures to the inner surface.

If we consider that Ri always has a greater value than 0, is possible to eliminate the second option that considers the case for Ri=0.

$$R = \sqrt{R_i^2 + \frac{\text{Volume}}{2}}\ [\text{in}]$$

$$R2 = \sqrt{R^2 + \text{Volume}}\ [\text{in}]$$

$$Extrapfact = \left(\frac{R^2 - R_i^2 \cdot \left(1 + 2 \cdot \log\left(\frac{R}{R_i}\right)\right)}{\text{Volume} - 2 \cdot R_i^2 \cdot \log\left(\frac{R_2}{R}\right)}\right)[\text{Dimensionless}]$$

ExtrapFact→Extrapolation Factor for Temperature at Bore Surface

Heatflow Factors

This block assigns a heatflow factor for the internal elements of the rotor. The heatflow factor for a specific rotor element is the average area normal to qi divided by the distance from element i to element i+1.

For *I*=2 To Nr−1

*R*2=Sqr(*R*^2+Volume)[in]

*A*(*I*)=(*R*+*R*2)/(*R*2−*R*)[in]

R=R2

Next I

Since the Finite Difference Method uses the conservation of energy for a specific rotor element to get the radial temperature distribution, the values of the heat flow factors vary radially too.

Surface & Bore Heatflow Factors

The previous formula to calculate the heatflow factors applies directly to all internal elements, but must be modified for the boundary elements to meet the boundary conditions. This block assigns the heatflow factor for the boundary elements.

*A*(1)=0[in]

*A*(*Nr*)=(*R*+*Ro*)/(*Ro*−*R*)[in]

*A*surf=2***Ro*/*A*(*Nr*)[in]

A(Nr)→Array of Nr elements.

Ramp Rates

This block defines the Time, Temperature, HTC and Speed Ramp Rates using the inputs of the previous block. The variable NumSubSteps defines the number of iterations of the new temperature distribution block.

*D*Time=Time−OldTime[min]

*D*Temp=*T*fluid−Old*T*fluid[° F.]

TempRamp=*D*Temp/*D*Time[° F./min]

*HTC*Ramp=(*HTC*−Old*HTC*)/*D*Time[BTU/hr·ft2·° F./min]

SpeedRamp=(Speed−OldSpeed)/*D*Time[RPM/min]

NumSubSteps=Int(Application.WorksheetFunction_

.Max(DTime/MaxDTime, Abs(DTemp/MaxDTemp), 1))[Dimensionless]

*DT*=*D*Time/NumSubSteps[min]

The accuracy of the calculation of the new temperature distribution calculation depends on the size of the time step. Sufficient accuracy is obtained if the maximum time step is DT.

New Temperature Distribution

This block calculates the new temperature distribution of the rotor setting new values for Tr elements.

For K=1 To NumSubSteps

TrSum=0

For I=2 To Nr

*DF*=Diff(*D*0, *DM*, *Tr*(*I*))[in2/min]

*Tr*New=*Tr*(*I*)−*DT***DF*/Volume*(*A*(*I*)*(*Tr*(*I*)−*Tr*(*I*+1))+*A*(*I*−1)*(*Tr*(*I*)−*Tr*(*I*−1)))[° F.]

*Tr*Sum=*Tr*Sum+*Tr*New[° F.]

*Tr*(*I*−1)=PrevNew[° F.]

PrevNew=TrNew [° F.]

Next I

The variable TrNew calculates the new temperature value for a specific rotor element using the corresponding values of thermal diffusivity and heatflow factor. The variable TrSum allows the required storage of information to calculate the average temperature (Tavg).

Time Delta

This block assigns new values for Time, Temperature and Speed using the maximum time step (DT).

Time=OldTime+*K***DT*[min]

*T*fluid=Old*T*fluid+TempRampK*DT*[° F.]

Speed=OldSpeed+SpeedRampK*DT*[RPM]

*Tr*(*Nr*)=*Tr*New [° F.]

Surface Temperature & HTC

This block assigns a new value for HTC and calculates the surface temperature (Tsurf). Since a convection heat transfer process is carried out between the rotor surface and the fluid, the fluid temperature (Tfluid) is required to calculate the temperature at the last rotor element Tr(Nodes).

*HTC*=Old*HTC*+*HTC*RampK*DT*[BTU/hr·ft2·° F.]

Cond=Rho*C**Diff(*D*0, *DM*, *Tr*(Nodes))[BTU·° F./in·min] (*A*)

Factor=(*HTC*/8640)**A*surf/Cond[Dimensionless]

*Tr*(Nodes)=(*Tr*(*Nr*)+Factor**T*fluid)/(1+Factor)[° F.]

*T*surf=*Tr*(Nodes)[° F.]

Bore & Average Temperatures

This block calculates the bore temperature (Tbore) and the average temperature (Tavg). To calculate the temperature of the first rotor element the extrapolation factor for temperature at bore surface (ExtrapFact) is required.

*Tr*(1)=*Tr*(2)−ExtrapFact*(*Tr*(3)−*Tr*(2))[° F.]

*T*bore=*Tr*(1)[° F.]

*T*avg=*Tr*Sum/Elements[° F.]

Surface Stress & Strain

This block calculates the surface stress and strain. The actual coefficient of thermal expansion (Alpha) is required.

Expn*C*=Alpha(*A*0, *AM*, *T*avg)[%/° F.]

SurfStrn=Expn*C**(*T*avg−*T*surf)[%]

SurfStrs=Modulus(*E*0, *EM*, *T*surf)*SurfStrn/0.7[*KSI*]

*PC*SurfAllow=100*SurfStrn/AllowSurfStrn[%]

Bore Stress

This block calculates the total bore stress. The actual coefficient of thermal expansion (Alpha) and the actual Young's modulus (Modulus) are required.

BoreCntrfStrs=SpeedFact*Speed^2[KSI]

BoreThrmStrs=Modulus(*E*0, *EM*, *T*bore)*Expn*C**(*T*avg−*T*bore)/0.7 [*KSI*]

TotBoreStrs=BoreThrmStrs+BoreCntrfStrs[*KSI*]

*PC*BoreAllow=100*TotBoreStrs/AllowBoreStrs[%]

Next K

While the invention has been described in terms of various specific embodiments, those skilled in the art will recognize that the invention can be practiced with modification within the spirit and scope of the claims.

What is claimed is:

1. A method of monitoring radial clearances in a steam turbine during operation of the turbine, the turbine comprising an outer shell and a rotor, the rotor comprising a rotor shaft and a plurality of rotor blades attached to the rotor shaft, said method comprising:

measuring a temperature of the rotor shaft at a $time_1$ and at a $time_2$;

measuring a temperature of at least one of the plurality of rotor blades at $time_1$ and at $time_2$;

measuring a temperature of the shell at $time_1$ and at $time_2$;

calculating a shaft radial growth between $time_1$ and $time_2$;

calculating a blade growth between $time_1$ and $time_2$;

calculating a shell radial growth between $time_1$ and $time_2$; and determining a change in a radial gap between the shell and a distal end of the rotor blade from $time_1$ to $time_2$ using the following equation:

change in radial gap=shell radial growth−shaft radial growth−blade growth, where the growth calculations are performed by using a finite difference method to obtain the instantaneous volume averaged temperatures of the rotor and the shell, and wherein at least one of the surrounding gas temperature and the measured blade temperatures is used to approximate the instantaneous averaged temperature of the plurality of rotor blades.

2. A method in accordance with claim 1 wherein calculating a shell radial growth comprises calculating a shell radial growth using the following equation:

$$\text{shell radial growth}=\alpha_S * R_S * T_S$$

where $\alpha_S$ is the coefficient of thermal expansion of the shell;

$R_S$ is an inner radius of the shell at the blade tip;

$T_S$ is an instantaneous volume averaged temperature of the shell.

3. A method in accordance with claim 2 wherein $T_S$ is an instantaneous volume averaged temperature of the shell at a top location.

4. A method in accordance with claim 2 wherein $T_S$ is an instantaneous volume averaged temperature of the shell at a bottom location.

5. A method in accordance with claim 2 wherein $T_S$ is an instantaneous volume averaged temperature of the shell at a side location.

6. A method in accordance with claim 1 wherein calculating a shaft radial growth comprises calculating a shaft radial growth using the following equation:

$$\text{shaft radial growth}=\alpha_R * R_R * T_R$$

where $\alpha_R$ is the coefficient of thermal expansion of the rotor;

$R_R$ is an outer radius of the rotor;

$T_R$ is an instantaneous volume averaged temperature of the rotor.

7. A method in accordance with claim 1 wherein calculating a rotor blade growth comprises calculating a rotor blade growth using the following equation:

$$\text{rotor blade growth} = \alpha_B * R_B * T_B$$

where $\alpha_B$ is the coefficient of thermal expansion of the blade;

$R_B$ is a length of the blade;

$T_B$ is an instantaneous volume averaged temperature of the blade.

8. A method of monitoring radial clearances in a steam turbine during operation of the turbine, the turbine comprising an outer shell and a rotor, the rotor comprising a rotor shaft and a plurality of rotor blades attached to the rotor shaft, said method comprising:

measuring a temperature of the rotor shaft continuously during operation;

measuring a temperature of at least one of the plurality of rotor blades continuously during operation;

measuring a temperature of the shell continuously during operation;

calculating a shaft radial growth as a function of rotor shaft temperature over time;

calculating a blade growth as a function of rotor blade temperature over time;

calculating a shell radial growth as a function of shell temperature over time; and determining a change in a radial gap between the shell and a distal end of the rotor blade over time using the following equation:

change in radial gap=shell radial growth−shaft radial growth−blade growth.

where the growth calculations are performed by using a finite difference method to obtain the instantaneous volume averaged temperatures of the rotor and the shell, and wherein at least one of the surrounding gas temperature and the measured blade temperatures is used to approximate the instantaneous averaged temperature of the plurality of rotor blades.

9. A method in accordance with claim 8 wherein calculating a shell radial growth comprises calculating a shell radial growth using the following equation:

$$\text{shell radial growth} = \alpha_S * R_S * T_S$$

where $\alpha_S$ is the coefficient of thermal expansion of the shell;

$R_S$ is an inner radius of the shell at the blade tip;

$T_S$ is an instantaneous volume averaged temperature of the shell.

10. A method in accordance with claim 9 wherein $T_S$ is an instantaneous volume averaged temperature of the shell at a top location.

11. A method in accordance with claim 9 wherein $T_S$ is an instantaneous volume averaged temperature of the shell at a bottom location.

12. A method in accordance with claim 9 wherein $T_S$ is an instantaneous volume averaged temperature of the shell at a side location.

13. A method in accordance with claim 8 wherein calculating a shaft radial growth comprises calculating a shaft radial growth using the following equation:

$$\text{shaft radial growth} = \alpha_R * R_R * T_R$$

where $\alpha_R$ is the coefficient of thermal expansion of the rotor;

$R_R$ is an outer radius of the rotor;

$T_R$ is an instantaneous volume averaged temperature of the rotor.

14. A method in accordance with claim 8 wherein said calculating a rotor blade growth comprises calculating a rotor blade growth using the following equation:

$$\text{rotor blade growth} = \alpha_B * L_B * T_B$$

where $\alpha_B$ is the coefficient of thermal expansion of the blade;

$L_B$ is a length of the blade;

$T_B$ is an instantaneous volume averaged temperature of the blade.

15. A method of monitoring radial clearances in a steam turbine during operation of the turbine, the turbine comprising an outer shell and a rotor, the rotor comprising a rotor shaft and a plurality of rotor blades attached to the rotor shaft, said method comprising:

calculating a shaft radial growth as a function of rotor shaft temperature over time;

calculating a blade growth as a function of at least one of the plurality of rotor blade temperature over time;

calculating a shell radial growth as a function of shell temperature over time; and determining a change in a radial gap between the shell and a distal end of the rotor blade over time using the following equation:

change in radial gap=shell radial growth−shaft radial growth−blade growth;

where the growth calculations are performed by using a finite difference method to obtain the instantaneous volume averaged temperatures of the rotor and the shell, and wherein at least one of the surrounding gas temperature and the measured blade temperatures is used to approximate the instantaneous averaged temperature of the plurality of rotor blades.

16. A method in accordance with claim 15 wherein calculating a shell radial growth comprises calculating a shell radial growth using the following equation:

$$\text{shell radial growth} = \alpha_S * R_S * T_S$$

where $\alpha_S$ is the coefficient of thermal expansion of the shell;

$R_S$ is an inner radius of the shell at the blade tip;

$T_S$ is an instantaneous volume averaged temperature of the shell.

17. A method in accordance with claim 16 wherein $T_S$ is an instantaneous volume averaged temperature of the shell at a top location.

18. A method in accordance with claim 16 wherein $T_S$ is an instantaneous volume averaged temperature of the shell at a bottom location.

19. A method in accordance with claim 16 wherein $T_S$ is an instantaneous volume averaged temperature of the shell at a side location.

20. A method in accordance with claim 15 wherein calculating a shaft radial growth comprises calculating a shaft radial growth using the following equation:

$$\text{shaft radial growth} = \alpha_R * R_R * T_R$$

where $\alpha_R$ is the coefficient of thermal expansion of the rotor;

$R_R$ is an outer radius of the rotor;

$T_R$ is an instantaneous volume averaged temperature of the rotor.

21. A method in accordance with claim 15 wherein calculating a rotor blade growth comprises calculating a rotor blade growth using the following equation:

$$\text{rotor blade growth}=\alpha_B*L_B*T_B$$

where $\alpha_B$ is the coefficient of thermal expansion of the blade;

$L_B$ is a length of the blade;

$T_B$ is an instantaneous volume averaged temperature of the blade.

22. A system for monitoring radial clearances in a steam turbine during operation of the turbine, the turbine comprising an outer shell and a rotor, the rotor comprising a rotor shaft and a plurality of rotor blades attached to the rotor shaft, said system comprising:

a measurement means configured to:

measure a temperature of the rotor shaft at a $time_1$ and at a $time_2$;

measure a temperature of at least one said plurality of rotor blades at $time_1$ and at $time_2$;

measure a temperature of the shell at $time_1$ and at $time_2$; and a calculation means configured to:

calculate a shaft radial growth between $time_1$ and $time_2$;

calculate a blade growth between $time_1$ and $time_2$;

calculate a shell radial growth between $time_1$ and $time_2$; and calculate a change in a radial gap between the shell and a distal end of the rotor blade from $time_1$ to $time_2$ using the following equation:

$$\text{change in radial gap}=\text{shell radial growth}-\text{shaft radial growth}-\text{blade growth},$$

where the growth calculations are performed by using a finite difference method to obtain the instantaneous volume averaged temperatures of the rotor and the shell, and wherein at least one of the surrounding gas temperature and the measured blade temperatures is used to approximate the instantaneous averaged temperature of the plurality of rotor blades.

23. A system in accordance with claim 22 wherein said calculation means is further configured to calculate the shell radial growth using the following equation:

$$\text{shell radial growth}=\alpha_S*R_S*T_S$$

where $\alpha_S$ is the coefficient of thermal expansion of the shell;

$R_S$ is an inner radius of the shell at the blade tip;

$T_S$ is an instantaneous volume averaged temperature of the shell.

24. A system in accordance with claim 23 wherein $T_S$ is an instantaneous volume averaged temperature of the shell at a top location.

25. A system in accordance with claim 23 wherein $T_S$ is an instantaneous volume averaged temperature of the shell at a bottom location.

26. A system in accordance with claim 23 wherein $T_S$ is an instantaneous volume averaged temperature of the shell at a side location.

27. A system in accordance with claim 22 wherein said calculation means is further configured to calculate the shaft radial growth using the following equation:

$$\text{shaft radial growth}=\alpha_R*R_R*T_R$$

where $\alpha_R$ is the coefficient of thermal expansion of the rotor;

$R_R$ is an outer radius of the rotor;

$T_R$ is an instantaneous volume averaged temperature of the rotor.

28. A system in accordance with claim 22 wherein said calculation means is further configured to calculate the rotor blade growth using the following equation:

$$\text{rotor blade growth}=\alpha_B*L_B*T_B$$

where $\alpha_B$ is the coefficient of thermal expansion of the blade;

$L_B$ is a length of the blade;

$T_B$ is an instantaneous volume averaged temperature of the blade.

* * * * *

UNITED STATES PATENT AND TRADEMARK OFFICE

CERTIFICATE OF CORRECTION

PATENT NO. : 6,853,945 B2
APPLICATION NO. : 10/401012
DATED : February 8, 2005
INVENTOR(S) : Namburi It is certified that error appears in the above-identified patent and that said Letters Patent is hereby corrected as shown below:

In Claim 8, column 9, line 32, delete “growth.” and insert therefor -- growth; --.

In Claim 15, column 10, line 21, delete “blade temperature over” and insert therefor -- blade temperatures over --.

In Claim 22, column 11, line 35, delete “growth,” and insert therefor -- growth; --.

Signed and Sealed this

Sixth Day of November, 2007

JON W. DUDAS

*Director of the United States Patent and Trademark Office*